(12) United States Patent
Czinger

(10) Patent No.: US 12,311,612 B2
(45) Date of Patent: May 27, 2025

(54) DIRECT INJECT JOINT ARCHITECTURE ENABLED BY QUICK CURE ADHESIVE

(71) Applicant: Divergent Technologies, Inc., Los Angeles, CA (US)

(72) Inventor: Lukas Philip Czinger, Santa Monica, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 331 days.

(21) Appl. No.: 17/548,180

(22) Filed: Dec. 10, 2021

(65) Prior Publication Data

US 2022/0194020 A1 Jun. 23, 2022

Related U.S. Application Data

(60) Provisional application No. 63/127,721, filed on Dec. 18, 2020.

(51) Int. Cl.
*B29C 65/48* (2006.01)
*B29C 64/153* (2017.01)
*B29C 65/54* (2006.01)

(52) U.S. Cl.
CPC ........ *B29C 65/4845* (2013.01); *B29C 65/542* (2013.01); *B29C 64/153* (2017.08)

(58) Field of Classification Search
CPC . B29C 65/4845; B29C 65/542; B29C 64/153; B33Y 80/00; B33Y 10/00; B22F 7/062; B22F 10/28
See application file for complete search history.

(56) References Cited

U.S. PATENT DOCUMENTS 5,203,226 A 4/1993 Hongou et al.
5,742,385 A 4/1998 Champa
5,990,444 A 11/1999 Costin
(Continued)

FOREIGN PATENT DOCUMENTS

WO 1996036455 A1 11/1996
WO 1996036525 A1 11/1996
(Continued)

OTHER PUBLICATIONS

US 9,202,136 B2, 12/2015, Schmidt et al. (withdrawn)
(Continued)

*Primary Examiner* — Christopher W Raimund
(74) *Attorney, Agent, or Firm* — ArentFox Schiff, LLP

(57) ABSTRACT

Methods and apparatuses for assembling components are described. An apparatus in accordance with an aspect of the present disclosure comprises a first structure having a first tongue, a second tongue, and a third tongue, the second tongue being between the first tongue and the third tongue, a second structure having a first groove, a second groove, and a third groove, the second groove being between the first groove and the third groove, a first adhesive, coupled to the first tongue and the first groove and coupled to the third tongue and the third groove when the first structure is coupled to the second structure, and a second adhesive coupled to the second tongue and the second groove when the first structure is coupled to the second structure, wherein the first adhesive is injected into the first groove and the third groove and the second adhesive is injected into the second groove.

6 Claims, 11 Drawing Sheets

(56) References Cited

U.S. PATENT DOCUMENTS

| | | |
|---|---|---|
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |

(56) References Cited

U.S. PATENT DOCUMENTS

| | | |
|---|---|---|
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |

(56) References Cited

U.S. PATENT DOCUMENTS

| | | | |
|---|---|---|---|
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2006/0108783 A1 | 5/2006 | Ni et al. | |
| 2010/0073425 A1* | 3/2010 | Yamamoto | B41J 2/14024 347/44 |
| 2010/0310829 A1 | 12/2010 | Yada | |
| 2012/0200946 A1* | 8/2012 | Wippermann | G02B 7/028 156/99 |
| 2014/0111837 A1 | 4/2014 | Menz | |
| 2014/0277669 A1 | 9/2014 | Nardi et al. | |
| 2015/0118447 A1* | 4/2015 | Fujikawa | H05K 3/305 156/275.7 |
| 2016/0381790 A1 | 12/2016 | Markovsky et al. | |
| 2017/0113344 A1 | 4/2017 | Schönberg | |
| 2017/0204890 A1 | 7/2017 | Lewis et al. | |
| 2017/0341309 A1 | 11/2017 | Piepenbrock et al. | |
| 2019/0011034 A1* | 1/2019 | Martinez | B33Y 80/00 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding International Application No. PCT/US2021/063142, Mar. 17, 2022.

* cited by examiner

DIRECT INJECT JOINT ARCHITECTURE ENABLED BY QUICK CURE ADHESIVE

CROSS-REFERENCE TO RELATED APPLICATIONS

The present disclosure claims the benefit under 35 U.S.C. 119 of U.S. Provisional Patent Application No. 63/127,721, filed Dec. 18, 2020 and entitled "DIRECT INJECT JOINT ARCHITECTURE ENABLED BY QUICK CURE ADHESIVE", which application is incorporated by reference herein in its entirety.

BACKGROUND

Field

The present disclosure relates generally to additive manufacturing, and more specifically to disassembly of an adhesively bonded structure.

Description of the Related Art

Three-dimensional (3-D) printing, also referred to as additive manufacturing (AM), has recently presented new opportunities to more efficiently build complex transport structures, such as automobiles, aircraft, boats, motorcycles, busses, trains, and the like. AM techniques are capable of fabricating complex components from a wide variety of materials. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print components that are much more complex and that are equipped with more advanced features and capabilities than components made via traditional machining and casting techniques.

Despite these recent advances, a number of obstacles remain with respect to the practical implementation of AM techniques in transport structures and other assemblies.

SUMMARY

The present disclosure is generally directed to techniques for disassembling adhesively-bonded additively manufactured components.

An apparatus in accordance with an aspect of the present disclosure comprises a first structure having a first tongue, a second tongue, and a third tongue, the second tongue being between the first tongue and the third tongue, a second structure having a first groove, a second groove, and a third groove, the second groove being between the first groove and the third groove, a first adhesive, coupled to the first tongue and the first groove and coupled to the third tongue and the third groove when the first structure is coupled to the second structure, and a second adhesive coupled to the second tongue and the second groove when the first structure is coupled to the second structure, wherein the first adhesive is injected into the first groove and the third groove and the second adhesive is injected into the second groove.

Such an apparatus further optionally includes the first adhesive being an ultraviolet (UV) curable adhesive, the first adhesive being cured prior to the injection of the second adhesive, the second adhesive being injected through at least one of the first groove and the third groove into the second groove, and ultraviolet (UV) traveling through the second groove to cure the first adhesive in the third groove.

Such an apparatus further optionally includes the second tongue and the second groove being larger than the first tongue and the first groove, the second tongue and the second groove being larger than the third tongue and the third groove, the second adhesive being a structural adhesive, a light beam being passed through the first groove and the second groove to cure the first adhesive in the third groove, the light beam reflecting from at least one surface of the first groove and the second groove, and the light beam further reflecting from at least one surface of the first tongue and the second tongue.

A method in accordance with an aspect of the present disclosure for coupling a first component having a first groove, a second groove, and a third groove, and a second component having a first tongue, a second tongue, and a third tongue, comprises injecting a first adhesive into the first groove and the third groove, coupling the first component and the second component such that the first tongue enters into the first groove and contacts the first adhesive, and the third tongue enters into the third groove and contacts the first adhesive, curing the first adhesive in the first groove and the third groove, and injecting a second adhesive into the second groove.

Such a method further optionally includes injecting the second adhesive into the second groove comprises injecting the second adhesive through at least one of the first groove and the third groove, curing the first adhesive comprises exposing the first adhesive to ultraviolet (UV) light, passing the UV light through the first groove and through the second groove to expose the first adhesive in the third groove to the UV light, reflecting the UV light from at least one surface of the first groove and the second groove, reflecting the UV light from at least one surface of the first tongue and the second tongue, and structurally coupling the first component and the second component with the second adhesive.

It will be understood that other aspects of joining components will become readily apparent to those skilled in the art from the following detailed description, wherein it is shown and described only several embodiments by way of illustration. As will be appreciated by those skilled in the art, the joining of additively manufactured components can be realized with other embodiments without departing from the scope of the present disclosure. Accordingly, the drawings and detailed description are to be regarded as illustrative in nature and not as restrictive.

BRIEF DESCRIPTION OF THE DRAWINGS

Various aspects of using a high-throughput, lower precision additive manufacturing process to produce large components in conjunction with a higher precision, lower throughput additive manufacturing process and the formation of a structural joint between the two components will now be presented in the detailed description by way of example, and not by way of limitation, in the accompanying drawings, wherein.

DETAILED DESCRIPTION

Figure 1A:
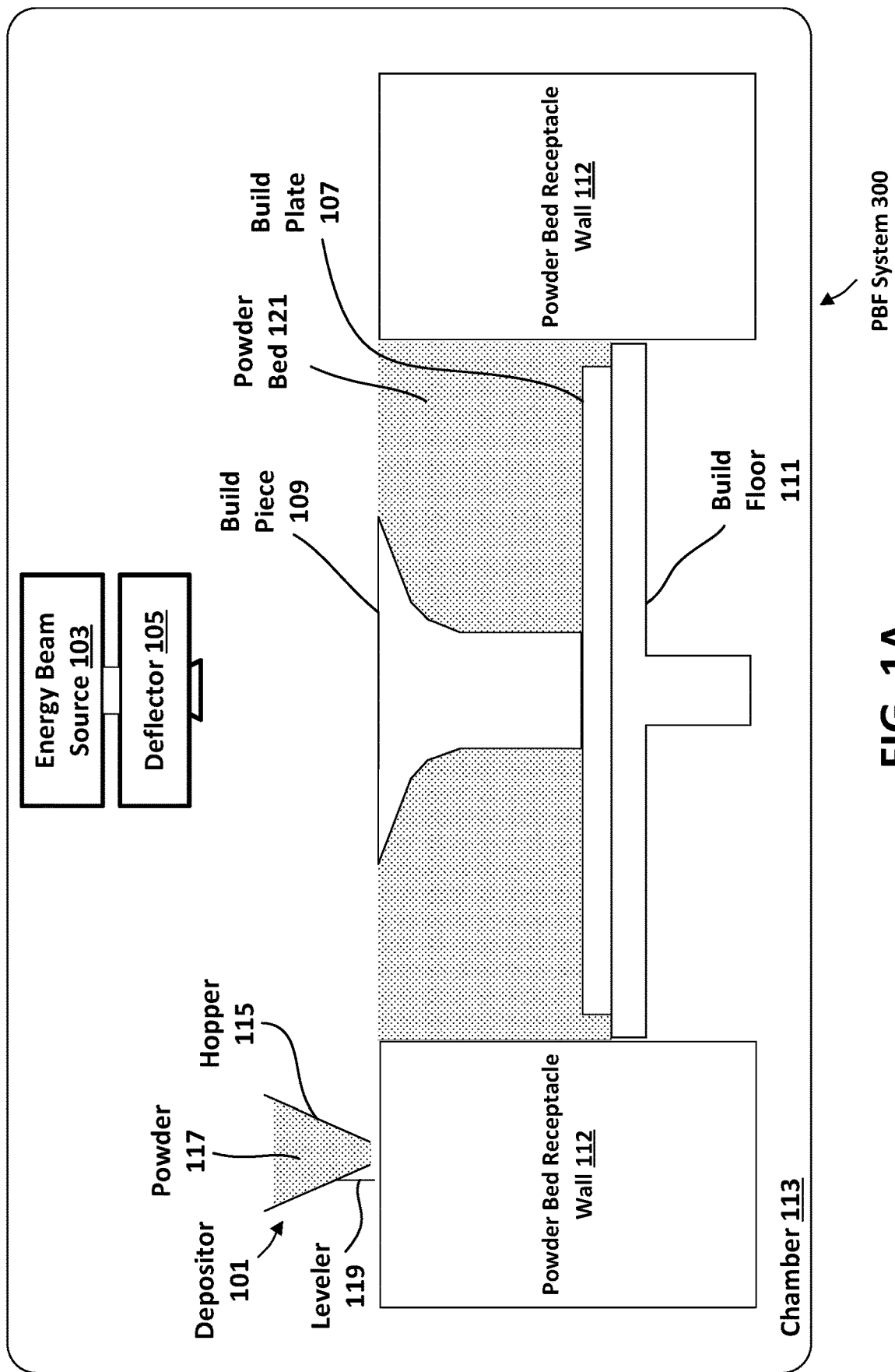
FIGS. 1A-1D illustrate respective side views of an exemplary PBF system during different stages of operation in accordance with an aspect of the present disclosure.

The detailed description set forth below in connection with the drawings is intended to provide a description of exemplary embodiments of joining additively manufactured nodes and subcomponents, and it is not intended to represent the only embodiments in which the disclosure may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the disclosure to those skilled in the art. However, the disclosure may be practiced without these specific details. In some instances, well-known structures and components may be shown in block diagram form, or omitted entirely, in order to avoid obscuring the various concepts presented throughout this disclosure.

Additive Manufacturing

Additive Manufacturing (AM) involves the use of a stored geometrical model for accumulating layered materials on a build plate to produce a three-dimensional (3-D) build piece having features defined by the model. AM techniques are capable of printing complex components using a wide variety of materials. A 3-D object may be fabricated based on a computer aided design (CAD) model. The CAD model can be used to generate a set of instructions or commands that are compatible with a particular 3-D printer. The AM process can create a solid three-dimensional object using the CAD model and print instructions. In the AM process, different materials or combinations of material, such as engineered plastics, thermoplastic elastomers, metals, ceramics, and/or alloys or combinations of the above, etc., may be used to create a uniquely shaped 3-dimensional object.

The use of AM in the context of joining two or more components may provide significant flexibility and cost saving benefits. These, and other benefits may enable manufacturers of mechanical structures to produce components at a lower cost and/or in a more efficient manner. The joining techniques described in the present disclosure relate to a process for connecting AM components and/or commercial off the shelf (COTS) components. AM components are 3-D components that are printed by, for example, adding layer upon layer of one or more materials based on a preprogramed design. The components described herein may be components used to assemble a variety of devices, such as engine components, structural components, etc. Further, such AM or COTS components may be used in assemblies, such as vehicles, trucks, trains, motorcycles, boats, aircraft, and the like, or other mechanized assemblies, without departing from the scope of the present disclosure.

Components and Terminology in AM

In an aspect of the present disclosure, a component is an example of an AM component. A component may be any 3-D printed component that includes features, such as an interface, for mating with another component. The component may have internal or external features configured to accept a particular type of component. Alternatively or additionally, the component may be shaped to accept a particular type of component. A component may utilize any internal design or shape and accept any variety of components without departing from the scope of the disclosure.

A component interface may be configured to connect to an interface of another component. For example, and not by way of limitation, an interface between components may be a tongue-and-groove structure. The interface may have high precision features or complex geometries that allow them to perform specific functions, including creating connections to spanning structures such as tubes, structural panels, extrusions, sheet metal, and/or other structural members. In various embodiments, interfaces are structures that incorporate one or more high precision features and that connect to other components or to Linking Nodes to form a versatile and efficient arrangement of functional components.

Interfaces may be high precision structures, meaning that they incorporate one or more features and/or functions that have tighter tolerances than other portions of the component. For example, and not by way of limitation, the tongue of one component may have a tolerance specified that enables the tongue to fit within a groove of another component, with a uniform flatness on all of the tongue surfaces to allow for a consistent volume of adhesive to flow between the tongue and mating groove. These features and/or functions, which may be integrated into the interface, may be defined by numerous physical properties and characteristics. Because the interface may be a complex consolidation of structures integrated into a single component, the interface may include both intricate connection features and sophisticated functional capabilities. These features and capabilities may enable the interface to seamlessly connect with larger, lower precision components without a significant sacrifice in production throughput.

For clarity, components may also include relatively simple connection features configured to connect with the more sophisticated network of connection features of the interface to form streamlined connections between structures. While these components may incorporate more basic features, they advantageously may be 3-D printed at a higher print rate. Alternatively, components may be built using a suitable non 3-D print manufacturing technology.

A number of different AM technologies may be well-suited for construction of components in a transport structure or other mechanized assembly. Such 3-D printing techniques may include, for example, directed energy deposition (DED), selective laser melting (SLM), selective laser sintering (SLS), direct metal laser sintering (DMLS), electron beam melting (EBM), powder bed fusion (PBF), and/or other AM processes involving melting or fusion of metallic powders. An advantage of the approach described herein is the structural improvements in joining components at interfaces.

As in many 3-D printing techniques, these processes (e.g., PBF systems) can create build pieces layer-by-layer. Each layer or "slice" is formed by depositing a layer of powder and exposing portions of the powder to an energy beam. The energy beam is applied to melt areas of the powder layer that coincide with the cross-section of the build piece in the layer. The melted powder cools and fuses to form a slice of the build piece. The process can be repeated to form the next slice of the build piece, and so on. Each layer is deposited on top of the previous layer. The resulting structure is a build piece assembled slice-by-slice from the ground up. SLS and various other PBF techniques may be well suited to construction of gear cases and other transport structure components. However, it will be appreciated that other AM techniques, such as fused deposition modeling (FDM) and the like, are also possible for use in such applications.

Directed energy deposition (DED) is an example of a high-throughput, lower precision AM process. DED is an AM technology primarily used to create structures from metals and alloys. This technique is used for both creating 3-D structures and for repairing existing structures. DED can be used for directly depositing material onto existing AM components. DED deposits material via a powder depositor or a wire feedstock.

One advantage of DED is that the technology can also be used to create build pieces including chunks of a single metal or alloy material directly on surfaces of other components. These uniform build pieces may have various uses in a vehicle, for example, where solid metal components are desired such as impact structures in a vehicle. The structural composition of current DED systems can vary. For example, in some DED systems, the material depositor is structurally separate from the energy source. In other DED systems, the material depositor and energy source are part of the same apparatus. However, an artifact of DED components are striations resulting from the deposition of material during the additive manufacturing process. Accordingly, removal of material upon completion of the 3-D print is desired for these components. The post-processing removal of striations can be a laborious and time-consuming process that introduces substantial inefficiencies into the overall manufacturing process. Manufacturers typically rely on labor-intensive and expensive techniques such as machining to complete the manufacturing process to achieve the desired final product for the 3-D printed component. Machining may result in a smoother surface finish of the component having the striations.

A tongue-and-groove (TNG) structure may be used to connect two or more components at an interface. For example, a tongue portion of one component may extend all the way around a peripheral region as a single protrusion disposed around the peripheral region. The tongue portion of a component may protrude outward along the peripheral region relative to that component, and the lateral extension of the tongue portion can be considered in this view as "coming out" of that component.

A groove portion of an interface is a portion of a second component and may be disposed along a peripheral region of the second component. The groove portion may, but need not, comprise the material of the second component. The groove portion may extend all the way around the peripheral region and may be a single channel in the second component. The groove portion may also be inset inward along the peripheral region relative to the second component and runs laterally around the second component. The tongue and groove may be arranged on the first and second components such that when the two components are placed into contact, the tongue may align with the groove and may fit into the groove around the peripheral regions at the interface between the two components. In an aspect of the present disclosure, a tongue and/or a groove may include centering features which enable the tongue to be centered in the groove.

While the above description relates primarily to using a tongue-and-groove structure to join two or more components, the techniques described in this disclosure are not only applicable to tongue-and-groove structures. In fact, any suitable technique for joining multiple structures may be used without departing from the scope of the disclosure.

Additive Manufacturing Environment

FIGS. 1A-1D illustrate respective side views of a 3-D printer system in an aspect of the present disclosure.

In an aspect of the present disclosure, a 3-D printer system may be a powder-bed fusion (PBF) system 100. FIGS. 1A-D show PBF system 100 during different stages of operation. The particular embodiment illustrated in FIGS. 1A-1D is one of many suitable examples of a PBF system employing principles of this disclosure. It should also be noted that elements of FIGS. 1A-1D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 200 individual layers, to form the current state of build piece 109, e.g., formed of 200 individual slices. The multiple individual layers already deposited have created a powder bed 121, which includes powder that was deposited but not fused.

Figure 1B:
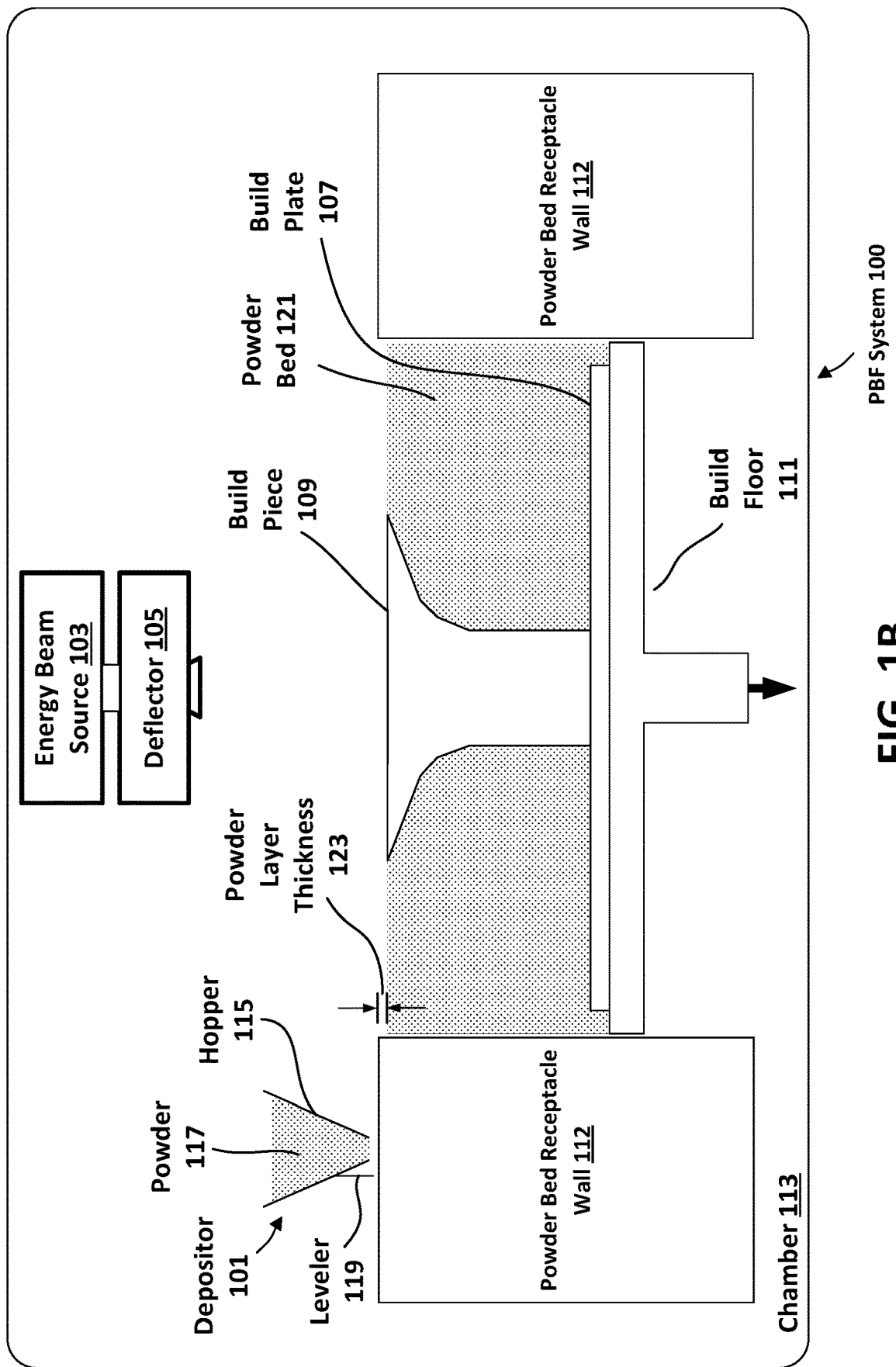

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of build piece 109 and powder bed 121 are lower than the top of powder bed receptacle wall 112 by an amount equal to the powder layer thickness 123. In this way, for example, a space with a consistent thickness equal to powder layer thickness 123 can be created over the tops of build piece 109 and powder bed 121.

Figure 1C:
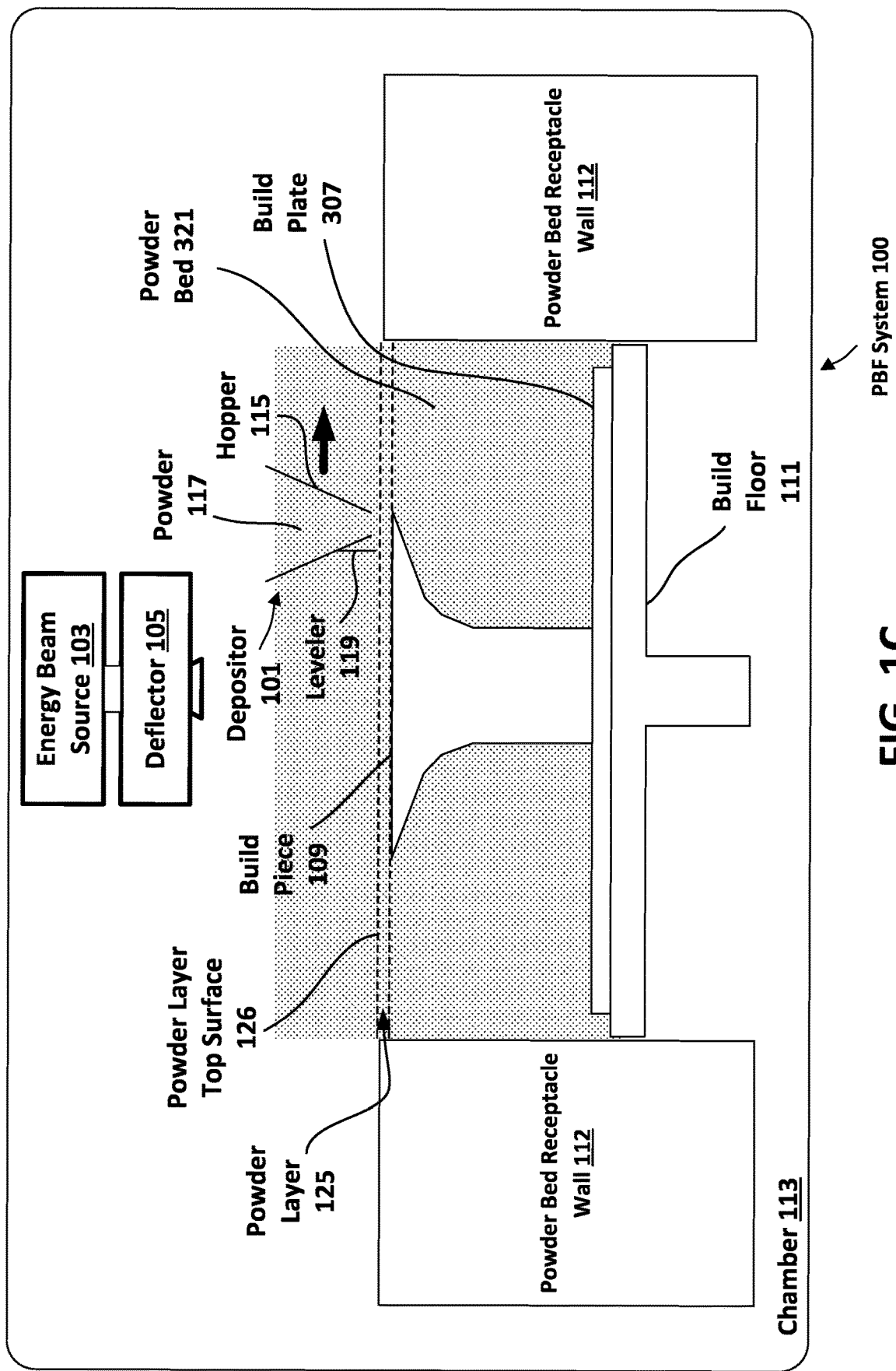

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that leaves powder layer top surface 126 configured to receive fusing energy from energy beam source 103. Powder layer 125 has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving the 200 previously-deposited individual layers discussed above with reference to FIG. 1A.

Figure 1D:
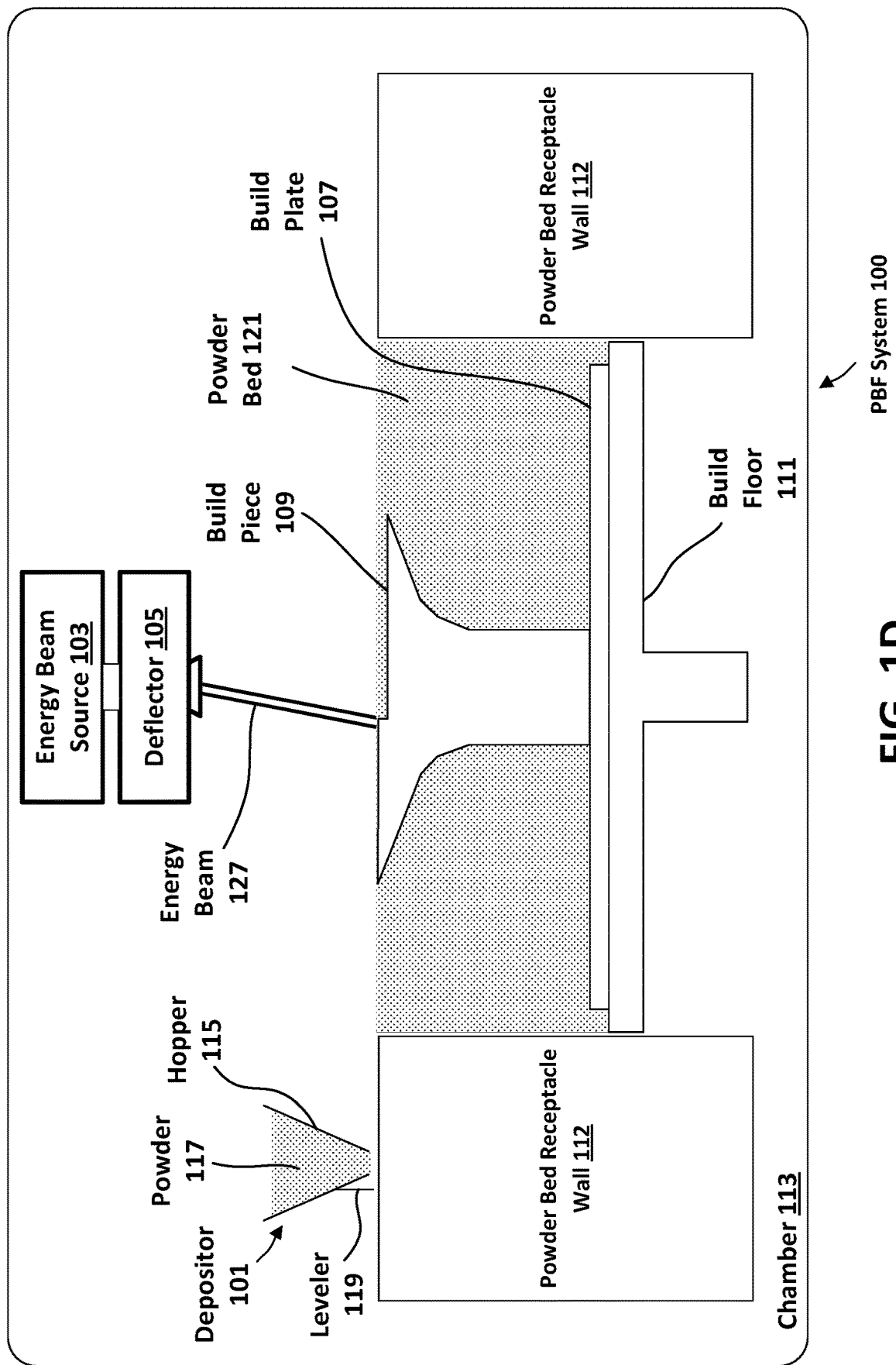

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
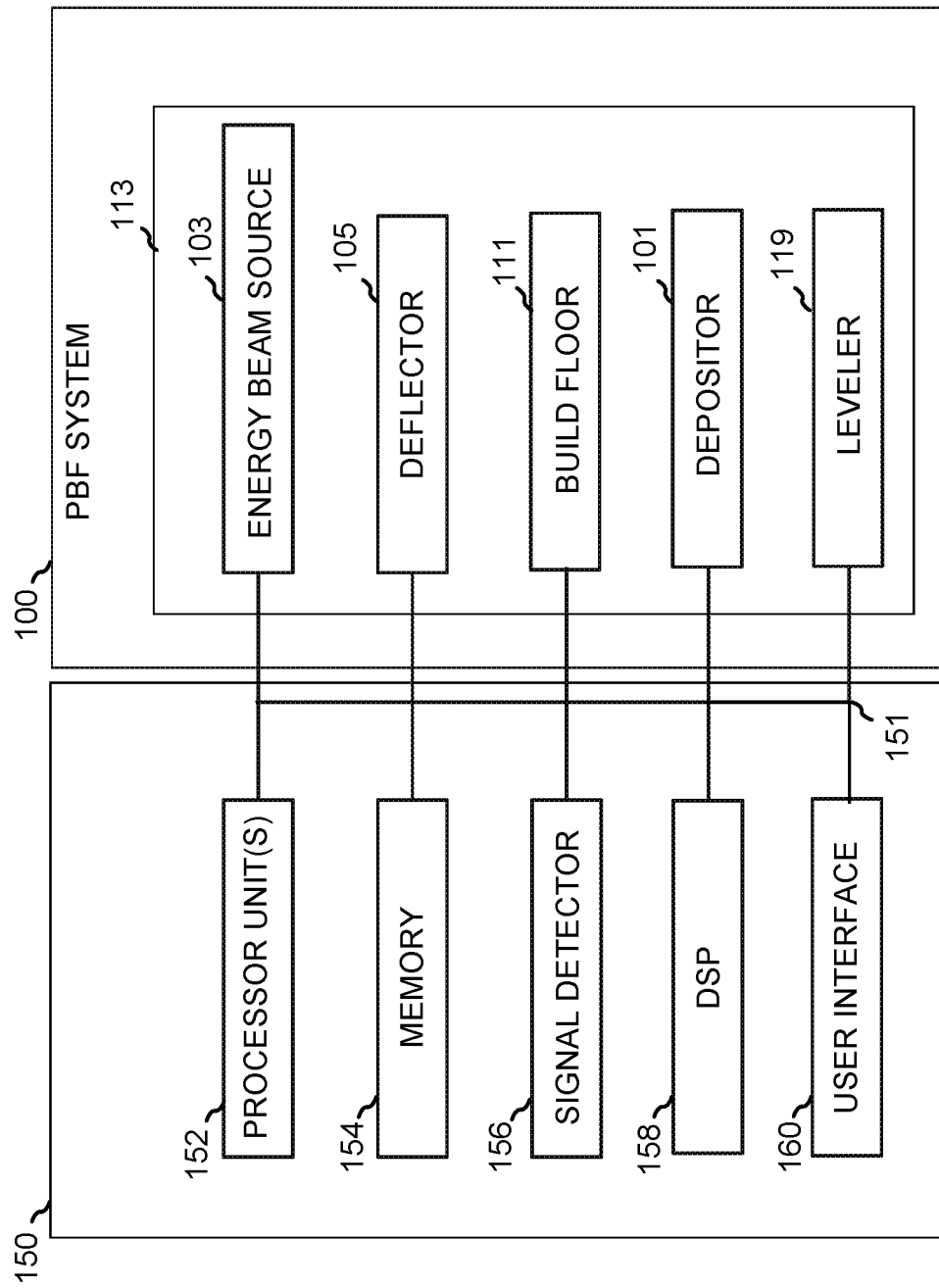
FIG. 1E illustrates a functional block diagram of a 3-D printer system in accordance with an aspect of the present disclosure.

FIG. 1E illustrates a functional block diagram of a 3-D printer system in accordance with an aspect of the present disclosure.

In an aspect of the present disclosure, control devices and/or elements, including computer software, may be coupled to PBF system 100 to control one or more components within PBF system 100. Such a device may be a computer 150, which may include one or more components that may assist in the control of PBF system 100. Computer 150 may communicate with a PBF system 100, and/or other AM systems, via one or more interfaces 151. The computer 150 and/or interface 151 are examples of devices that may be configured to implement the various methods described herein, that may assist in controlling PBF system 100 and/or other AM systems.

In an aspect of the present disclosure, computer 150 may comprise at least one processor unit 152, memory 154, signal detector 156, a digital signal processor (DSP) 158, and one or more user interfaces 160. Computer 150 may include additional components without departing from the scope of the present disclosure.

The computer 150 may include at least one processor unit 152, which may assist in the control and/or operation of PBF system 100. The processor unit 152 may also be referred to as a central processing unit (CPU). Memory 154, which may include both read-only memory (ROM) and random access memory (RAM), may provide instructions and/or data to the processor 304. A portion of the memory 154 may also include non-volatile random access memory (NVRAM). The processor 152 typically performs logical and arithmetic operations based on program instructions stored within the memory 154. The instructions in the memory 154 may be executable (by the processor unit 152, for example) to implement the methods described herein.

The processor unit 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 150 may also include a signal detector 156 that may be used to detect and quantify any level of signals received by the computer 150 for use by the processing unit 152 and/or other components of the computer 150. The signal detector 156 may detect such signals as energy beam source 103 power, deflector 105 position, build floor 111 height, amount of powder 117 remaining in depositor 101, leveler 119 position, and other signals. Signal detector 156, in addition to or instead of processor unit 152 may also control other components as described with respect to the present disclosure. The computer 150 may also include a DSP 158 for use in processing signals received by the computer 150. The DSP 158 may be configured to generate instructions and/or packets of instructions for transmission to PBF system 100.

The computer 150 may further comprise a user interface 160 in some aspects. The user interface 160 may comprise a keypad, a pointing device, and/or a display. The user interface 160 may include any element or component that conveys information to a user of the computer 150 and/or receives input from the user.

The various components of the computer 150 may be coupled together by a bus system 151. The bus system 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor unit 152 may be used to implement not only the functionality described above with respect to the processor unit 152, but also to implement the functionality described above with respect to the signal detector 156, the DSP 158, and/or the user interface 160. Further, each of the components illustrated in FIG. 1E may be implemented using a plurality of separate elements.

By way of example, an element, or any portion of an element, or any combination of elements may be implemented using one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors may execute software as that term is described above.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

Robotic Assembly Environment

Figure 2:
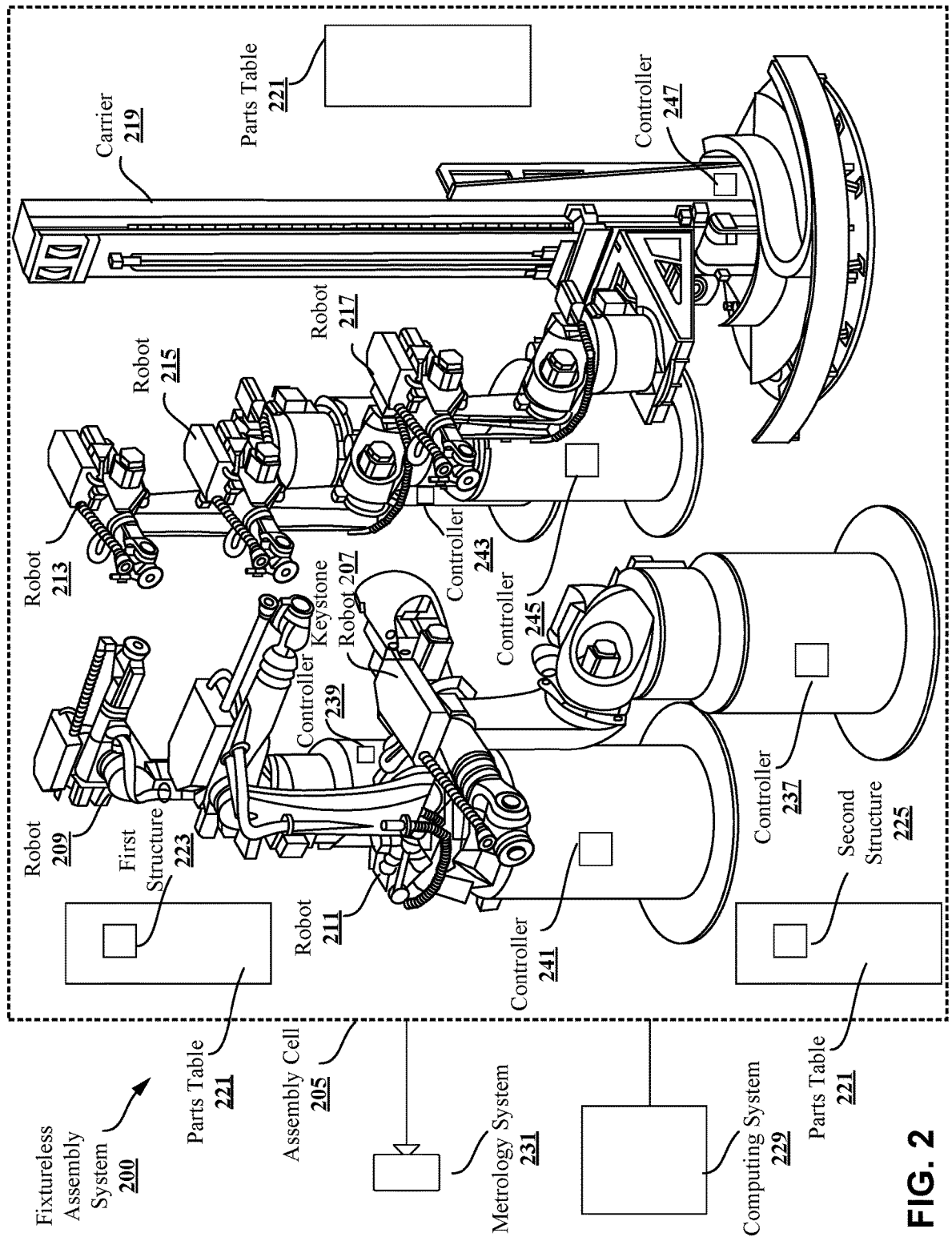
FIG. 2 illustrates a perspective view of an example of a fixtureless assembly system in accordance with an aspect of the present disclosure.

FIG. 2 illustrates a perspective view of an example of a fixtureless assembly system 200. Fixtureless assembly system 200 may be employed in various operations associated with fixtureless assembly of a vehicle, such as robotic assembly of a node-based vehicle. Fixtureless assembly system 200 may include one or more elements associated with at least a portion of the assembly of a vehicle without any fixtures. For example, one or more elements of fixtureless assembly system 200 may be configured for one or more operations in which a first structure is joined with one or more other structures without the use of any fixtures during robotic assembly of a node-based vehicle.

An assembly cell 205 may be configured at the location of fixtureless assembly system 200. Assembly cell 205 may be a vertical assembly cell. Within assembly cell 205, fixtureless assembly system 200 may include a set of robots 207, 209, 211, 213, 215, 217. Robot 207 may be referred to as a keystone robot. Fixtureless assembly system 200 may include parts tables 221 that can hold parts and structures for the robots to access. For example, a first structure 223 and a second structure 225 may be positioned on one of parts tables 221 to be picked up by the robots and assembled together. In various embodiments, one or more of the structures can be an additively manufactured structure, such as a complex node.

Fixtureless assembly system 200 may also include a computing system 229 to issue commands to the various controllers of the robots of assembly cell 205. In this example, computing system 229 is communicatively connected to the robots through wireless communication. Fixtureless assembly system 200 may also include a metrology system 231 that can accurately measure the positions of the robotic arms of the robots and/or the structures held by the robots.

In contrast to conventional robotic assembly factories, structures can be assembled without fixtures in fixtureless assembly system 200. For example, structures need not be connected within any fixtures, such as the fixtures described above. Instead, at least one of the robots in assembly cell 205 may provide the functionality expected from fixtures. For example, robots may be configured to directly contact (e.g., using an end effector of a robotic arm) structures to be assembled within assembly cell 205 so that those structures may be engaged and retained without any fixtures. Further, at least one of the robots may provide the functionality expected from the positioner and/or fixture table. For example, keystone robot 207 may replace a positioner and/or fixture table in fixtureless assembly system 200.

Keystone robot 207 may include a base and a robotic arm. The robotic arm may be configured for movement, which may be directed by computer-executable instructions loaded into a processor communicatively connected with keystone robot 207. Keystone robot 207 may contact a surface of assembly cell 205 (e.g., a floor of the assembly cell) through the base.

Keystone robot 207 may include and/or be connected with an end effector that is configured to engage and retain a first structure, e.g., a portion of a vehicle. An end effector may be a component configured to interface with at least one structure. Examples of the end effectors may include jaws, grippers, pins, or other similar components capable of facilitating fixtureless engagement and retention of a structure by a robot. In some embodiments, the first structure may be a section of a vehicle chassis, body, frame, panel, base piece, and the like. For example, the first structure may comprise a floor panel.

In some embodiments, keystone robot 207 may retain the connection with a first structure through an end effector while a set of other structures is connected (either directly or indirectly) to the first structure. Keystone robot 207 may be configured to engage and retain the first structure without any fixtures—e.g., none of the fixtures described above may be present in fixtureless assembly system 200. In some embodiments, structures to be retained by at least one of the robots (e.g., the first structure) may be additively manufactured or co-printed with one or more features that facilitate engagement and retention of those structures by the at least one of the robots without the use of any fixtures.

In retaining the first structure, keystone robot 207 may position (e.g., move) the first structure; that is, the position of the first structure may be controlled by keystone robot 207 when retained by the keystone robot. Keystone robot 207 may retain the first structure by holding or grasping the first structure, e.g., using an end effector of a robotic arm of the keystone robot. For example, keystone robot 207 may retain the first structure by causing gripper fingers, jaws, and the like to contact one or more surfaces of the first structure and apply sufficient pressure thereto such that the keystone robot controls the position of the first structure. That is, the first structure may be prevented from moving freely in space when retained by keystone robot 207, and movement of the first structure may be constrained by the keystone robot. As described above, the first structure may include one or more features that facilitates the fixtureless engagement and retention of the first structure by keystone robot 207.

As other structures (including subassemblies, substructures of structures, etc.) are connected to the first structure, keystone robot 207 may retain the engagement with the first structure through the end effector. The aggregate of the first structure and one or more structures connected thereto may be referred to as a structure itself, but may also be referred to as an assembly or a subassembly. Keystone robot 207 may retain an engagement with an assembly once the keystone robot has engaged the first structure.

In some embodiments, robots 209 and 211 of assembly cell 205 may be similar to keystone robot 207 and, thus, may include respective end effectors configured to engage with structures that may be connected with the first structure when retained by the keystone robot. In some embodiments, robots 209, 211 may be referred to as assembly robots and/or materials handling robots.

In some embodiments, robot 213 of assembly cell 205 may be used to affect a structural connection between the first structure and the second structure. For instance, robot 213 may be referred to as a structural adhesive robot. Structural adhesive robot 213 may be similar to the keystone robot 207, except the structural adhesive robot may include a tool at the distal end of the robotic arm that is configured to apply structural adhesive to at least one surface of structures fixturelessly retained by the keystone robot and structures fixturelessly retained by assembly robots 209, 211 before or after the structures are positioned at joining proximities with respect to other structures for joining with the other structures. The joining proximity can be a position that allows a first structure to be joined to a second structure. For example, in various embodiments, the first and second structures may be joined though the application of an adhesive while the structures are within the joining proximity and subsequent curing of the adhesive.

In various embodiments a quick-cure adhesive may be additionally applied to join the structures quickly and retain the structures so that the structural adhesive can cure without both robots holding the structures. In this regard, robot 215 of fixtureless assembly system 200 may be used to apply quick-cure adhesive and to cure the adhesive quickly. In this example embodiment, a quick-cure UV adhesive may be used, and robot 215 may be referred to as a UV robot. UV robot 215 may be similar to keystone robot 207, except the UV robot may include a tool at the distal end of the robotic arm that is configured to apply a quick-cure UV adhesive and to cure the adhesive, e.g., when the first structure is positioned within the joining proximity with respect to the second structure. That is, UV robot 215 may cure an adhesive after the adhesive is applied to the first structure and/or second structure when the structures are within the joining proximity obtained through direction of at least one of the robotic arms of keystone robot 207 and/or assembly robots 209, 211.

In various embodiments, a robot may be used for multiple different roles. For example, robot 217 may perform the role of an assembly robot, such as assembly robots 209, 211, and the role of a UV robot, such as UV robot 215. In this regard, robot 217 may be referred to as an "assembly/UV robot." Assembly/UV robot 217 may offer functionality similar to each of the assembly robots 109, 111 when the distal end of the robotic arm of the assembly/UV robot includes an end effector (e.g., connected by means of a tool flange). However, assembly/UV robot 217 may offer functionality similar to UV robot 215 when the distal end of the robotic arm of the assembly/UV robot includes a tool configured to applied UV adhesive and to emit UV light to cure the UV adhesive.

The quick-cure adhesive applied by UV robot 215 and assembly/UV robot 217 may provide a partial adhesive bond in that the adhesive may retain the relative positions of a first structure and a second structure within the joining proximity until the structural adhesive may be cured to permanently join the first structure and the second structure.

In assembling at least a portion of a vehicle in assembly cell 205, the second structure may be joined directly to the first structure by directing the various fixtureless robots 207, 209, 211, 213, 215, 217. Additional structures may be indirectly joined to the first structure. For example, the first structure may be directly joined to the second structure through movement(s) of keystone robot 207, structural adhesive robot 213, at least one assembly robot 209, 211, and/or UV robot 215. Thereafter, the first structure, joined with the second structure, may be indirectly joined to an additional structure as the additional structure is directly joined to the second structure. Thus, the first structure, which may continue to be retained by keystone robot 207, may evolve throughout an assembly process as additional structures are directly or indirectly joined to it.

In some embodiments, assembly robots 209, 211 may fixturelessly join two or more structures together, e.g., with a partial, quick-cure adhesive bond, before fixturelessly joining those two or more structures with the first structure retained by keystone robot 207. The two or more structures that are joined to one another prior to being joined with a structural assembly may also be a structure, and may further be referred to as a subassembly. Accordingly, when a structure forms a portion of a structural subassembly that is connected with the first structure through movements of keystone robot 107, structural adhesive robot 213, at least one assembly robot 209, 211, and UV robot 215, a structure of the structural subassembly may be indirectly connected to the first structure when the structural subassembly is joined to a structural assembly including the first structure.

In some embodiments, the structural adhesive may be applied, e.g., deposited in a groove of one of the structures, before the first and second structures are brought within the joining proximity. For example, structural adhesive robot 213 may include a dispenser for a structural adhesive and may apply the structural adhesive prior to the structures being brought within the joining proximity. In some embodiments, a structural adhesive may be applied after a structural assembly is fully constructed (that is, once each structure of the portion of the vehicle is joined to the first structure). For example, the structural adhesive may be applied to one or more joints or other connections between the first structure and the second structure. In some embodiments, the structural adhesive may be applied separately from fixtureless assembly system 200.

After the assembly is complete, i.e., all of the structures have been assembled, retained with a partial adhesive bond, with structural adhesive having been applied, the structural adhesive may be cured. Upon curing the structural adhesive, the portion of the vehicle may be completed and, therefore, may be suitable for use in the vehicle. For example, a completed structural assembly may meet any applicable industry and/or safety standards defined for consumer and/or commercial vehicles.

According to various embodiments, one or more of robots 207, 209, 211, 213, 215, 217 may be secured to a surface of assembly cell 205 through a respective base of each of the robots. For example, one or more of the robots may have a base that is bolted to the floor of the assembly cell. In various other embodiments, one or more of the robots may include or may be connected with a component configured to move the robot within assembly cell 205. For example, a carrier 219 in assembly cell 205 may be connected to assembly/UV robot 217.

Each of robots 207, 209, 211, 213, 215, 217 may include features that are common across all or some of the robots. For example, all of the robots may include a base, each of which having a surface (e.g., a bottom surface) that contacts assembly cell 205 (e.g., rests on or is secured to a floor of the assembly cell). Each base may have another surface (e.g., a top surface and/or a surface disposed on the base opposite from the surface contacting assembly cell 205) and, at a respective other surface, a base may connect with a proximal end of a respective robotic arm of a respective one of the robots.

In some embodiments, a base may be connected to the proximal end of a robotic arm through at least one rotation and/or translation mechanism. The at least one rotation and/or translation mechanism may provide at least one degree of freedom in movement of an end effector or other tool of the robotic arm. Correspondingly, the at least one rotation and/or translation mechanism may provide at least one degree of freedom in movement of a structure that is engaged and retained by an end effector or other tool of the robotic arm.

Each robotic arm of robots 207, 209, 211, 213, 215, 217 may include a distal end, oppositely disposed from the proximal end of the robotic arm. Each robotic arm of each of the robots may include an end effector and/or a tool, such as an adhesive application tool, curing tool, and so forth. An end effector or a tool may be at the distal end of a robotic arm. In some embodiments, the distal end of a robotic arm may be connected to an end effector or a tool (or tool flange) through at least one rotation and/or translation mechanism, which may provide at least one degree of freedom in movement of the tool and/or movement of a structure engaged and retained by the tool of the robotic arm.

In some embodiments, the distal end of a robotic arm may include a tool flange, and a tool included at the tool flange; for example, a tool may be connected to the distal end of a robotic arm by means of the tool flange. A tool flange may be configured to include a plurality of tools. In this way, for example, the assembly/UV robot 217 may offer functionality similar to each of the assembly robots 209, 211 when a distal end of a robotic arm of the assembly/UV robot 217 includes an end effector (e.g., connected by means of the tool flange). In addition, the assembly/UV robot 217 may offer functionality similar to the UV robot 215 when the distal end of the robotic arm of the assembly/UV robot 217 includes a tool configured to apply UV adhesive and to emit UV light to cure the adhesive.

According to some embodiments, a tool flange and/or tool may provide one or more additional degrees of freedom for rotation and/or translation of a structure engaged and retained by the tool. Such additional degrees of freedom may supplement the one or more degrees of freedom provided through one or more mechanisms connecting a base to the proximal end of a robotic arm and/or connecting the distal end of a robotic arm to the tool (or tool flange). Illustratively, a robotic arm of at least one of robots 207, 209, 211, 213, 215, 217 may include at least one joint configured for rotation and/or translation at a distal and/or proximal end, such as an articulating joint, a ball joint, and/or other similar joint.

One or more of the respective connections of robots 207, 209, 211, 213, 215, 217 (e.g., one or more rotational and/or translational mechanisms connecting various components of one of the robots), a respective tool flange, and/or a respective tool may provide at least a portion (and potentially all) of six degrees of freedom (6 DoF) for a structure engaged and retained by the robots. The 6 DoF may include forward/backward (e.g., surge), up/down (e.g., heave), left/right (e.g., sway) for translation in space and may further include yaw, pitch, and roll for rotation in space. Access to various portions of a structure may be attainable through one or more of the 6 DoF, as opposed to retention of a structure using a fixture, which cannot offer 6 DoF in movement of a structure and also blocks access to a significant portion of a structure attached thereto.

Each of the robots 207, 209, 211, 213, 215, 217 may be communicatively connected with a controller, such as a respective one of controllers 237, 239, 241, 243, 245, 247 shown in FIG. 2. Each of controllers 237, 239, 241, 243, 245, 247 may include, for example, a memory and a processor communicatively connected to the memory, and may be similar to the computer 150 and memory 154 as described with respect to FIG. 1. According to some other embodiments, one or more of controllers 237, 239, 241, 243, 245, 247 may be implemented as a single controller that is communicatively connected to one or more of the robots controlled by the single controller.

Computer-readable instructions for performing fixtureless assembly can be stored on the memories of controllers 237, 239, 241, 243, 245, 247, and the processors of the controllers can execute the instructions to cause robots 207, 209, 211, 213, 215, 217 to perform various fixtureless operations, such as those described above.

Controllers 237, 239, 241, 243, 245, 247 may be communicatively connected to one or more components of an associated robot 207, 209, 211, 213, 215, or 217, for example, via a wired (e.g., bus or other interconnect) and/or wireless (e.g., wireless local area network, wireless intranet) connection. Each of the controllers may issue commands, requests, etc., to one or more components of the associated robot, for example, in order to perform various fixtureless operations.

According to some embodiments, controllers 237, 239, 241, 243, 245, 247 may issue commands, etc., to a robotic arm of the associated robot 207, 209, 211, 213, 215, or 217 and, for example, may direct the robotic arms based on a set of absolute coordinates relative to a global cell reference frame of assembly cell 205. In various embodiments, controllers 237, 239, 241, 243, 245, 247 may issue commands, etc., to tools connected to the distal ends of the robotic arms. For example, the controllers may control operations of the tool, including depositing a controlled amount of adhesive on a surface of the first structure or second structure by an adhesive applicator, exposing adhesive deposited between structures to UV light for a controlled duration by a curing tool, and so forth. In various embodiments, controllers 237, 239, 241, 243, 245, 247 may issue commands, etc., to end effectors at the distal ends of the robotic arms. For example, the controllers may control operations of the end effectors, including, engaging, retaining, and/or manipulating a structure.

According to various other aspects, a computing system, such as computing system 229, similarly having a processor and memory, may be communicatively connected with one or more of controllers 237, 239, 241, 243, 245, 247. In various embodiments, the computing system may be communicatively connected with the controllers via a wired and/or wireless connection, such as a local area network, an intranet, a wide area network, and so forth. In some embodiments, the computing system may be implemented in one or more of controllers 237, 239, 241, 243, 245, 247. In some other embodiments, the computing system may be located outside assembly cell 205.

The processor of the computing system may execute instructions loaded from memory, and the execution of the instructions may cause the computing system to issue commands, etc., to the controllers 237, 239, 241, 243, 245, 247, such as by transmitting a message including the command, etc., to one of the controllers over a network connection or other communication link.

According to some embodiments, one or more of the commands may indicate a set of coordinates and may indicate an action to be performed by one of robots 207, 209, 211, 213, 215, 217 associated with the one of the controllers that receives the command. Examples of actions that may be indicated by commands include directing movement of a robotic arm, operating a tool, engaging a structure by an end effector, rotating and/or translating a structure, and so forth. For example, a command issued by a computing system may cause controller 239 of assembly robot 209 to direct a robotic arm of assembly robot 209 so that the distal end of the robotic arm may be located based on a set of coordinates that is indicated by the command.

The instructions loaded from memory and executed by the processor of the computing system, which cause the controllers to control actions of the robots may be based on computer-aided design (CAD) data. For example, a CAD model of assembly cell 205 (e.g., including CAD models of the physical robots) may be constructed and used to generate the commands issued by the computing system.

Accordingly, in one example of a fixtureless assembly process, multiple robots (e.g., robots 207, 209, 211, 213, 215, and/or 17) are controlled (e.g., by computing system 229 and/or one or more controller(s) 237, 239, 241, 243, 245, 247) to join two structures together within an assembly cell (e.g. a vertical assembly cell such as assembly cell 205). The assembly operations may be performed repeatedly so that multiple structures may be joined for fixtureless assembly of at least a portion of a vehicle (e.g., vehicle chassis, body, panel, and the like). A first material handling robot (e.g., robot 209) may retain (e.g., using an end effector) a first structure (e.g., first structure 223) that is to be joined with a second structure (e.g., second structure 225) similarly retained by a second material handling robot (e.g., robot 211). A structural adhesive dispensing robot (e.g., robot 213) may apply structural adhesive to a surface of the first structure retained by the first robot. The first material handling robot may then position the first structure at a joining proximity with respect to the second structure retained by the second material handling robot. A metrology system (e.g., metrology system 231) may implement a move-measure-correct (MMC) procedure to accurately measure, correct, and move the robotic arms of the robots and/or the structures held by the robots into optimal positions at the joining proximity (e.g. using laser scanning and/or tracking).

The positioned structures (e.g., structures 223, 225) may then be joined together using the structural adhesive and cured (e.g. over time or using heat). However, as the curing rate of the structural adhesive may be relatively long, a quick-cure adhesive robot (e.g., robot 215 or robot 217) additionally applies a quick-cure adhesive to the first and/or second structures when the first and second structures are within the joining proximity, and then the quick-cure adhesive robot switches to an end-effector which emits electromagnetic (EM) radiation (e.g. ultraviolet (UV) radiation) onto the quick-cure adhesive. For example, the quick-cure adhesive robot may apply UV adhesive strips across the surfaces of the first and/or second structures such that the UV adhesive contacts both structures, and then the robot may emit UV radiation onto the UV adhesive strips. Upon exposure to the EM radiation, the quick-cure adhesive cures at a faster curing rate than the curing rate of the structural adhesive, thus allowing the first and second structure to be retained in their relative positions without fixtures so that the robots may quickly attend to other tasks (e.g. retaining and joining other parts) without waiting for the structural adhesive to cure. Once the structural adhesive cures, the first and second structures are bonded with structural integrity.

However, as the first and second structures in the joining proximity may be oriented in a variety of positions, the UV adhesive strips contacting the surface(s) may occasionally move (e.g. drip off). For instance, one structure may be positioned upside-down relative to another structure, and the UV adhesive may therefore drip off due to gravity. As a result, when the UV adhesive is cured, the first and second structures may be inadvertently retained in positions that do not provide acceptable tolerance, impacting the structural integrity of the assembly.

Difficulties in applying UV adhesive at the joining proximity may also cause improper retention of structures. For example, the material handling robots retaining the first and second structures in the joining proximity may be tightly packed in the assembly cell. As a result, a quick-cure adhesive robot may have difficulty maneuvering around the material handling robots and applying the UV adhesive to the structures in the joining proximity within this tightly packed area. Moreover, since the metrology system may also be using laser tracking to perform MMC for these structures in this tightly packed area, the quick-cure adhesive robot may potentially obstruct the lasers and the MMC process when attempting to apply the UV adhesive. As a result, the entire assembly may be impacted. For instance, when assemblies are formed by stacking different parts, the misalignment of one structure may affect the alignment of other parts which the structure supports. Additionally, since structures and subassemblies are frequently moved during the assembly process, an improper retention may cause the structures or subassemblies to deflect or drop from the assembly.

Joint Assembly and Disassembly

Figure 3:
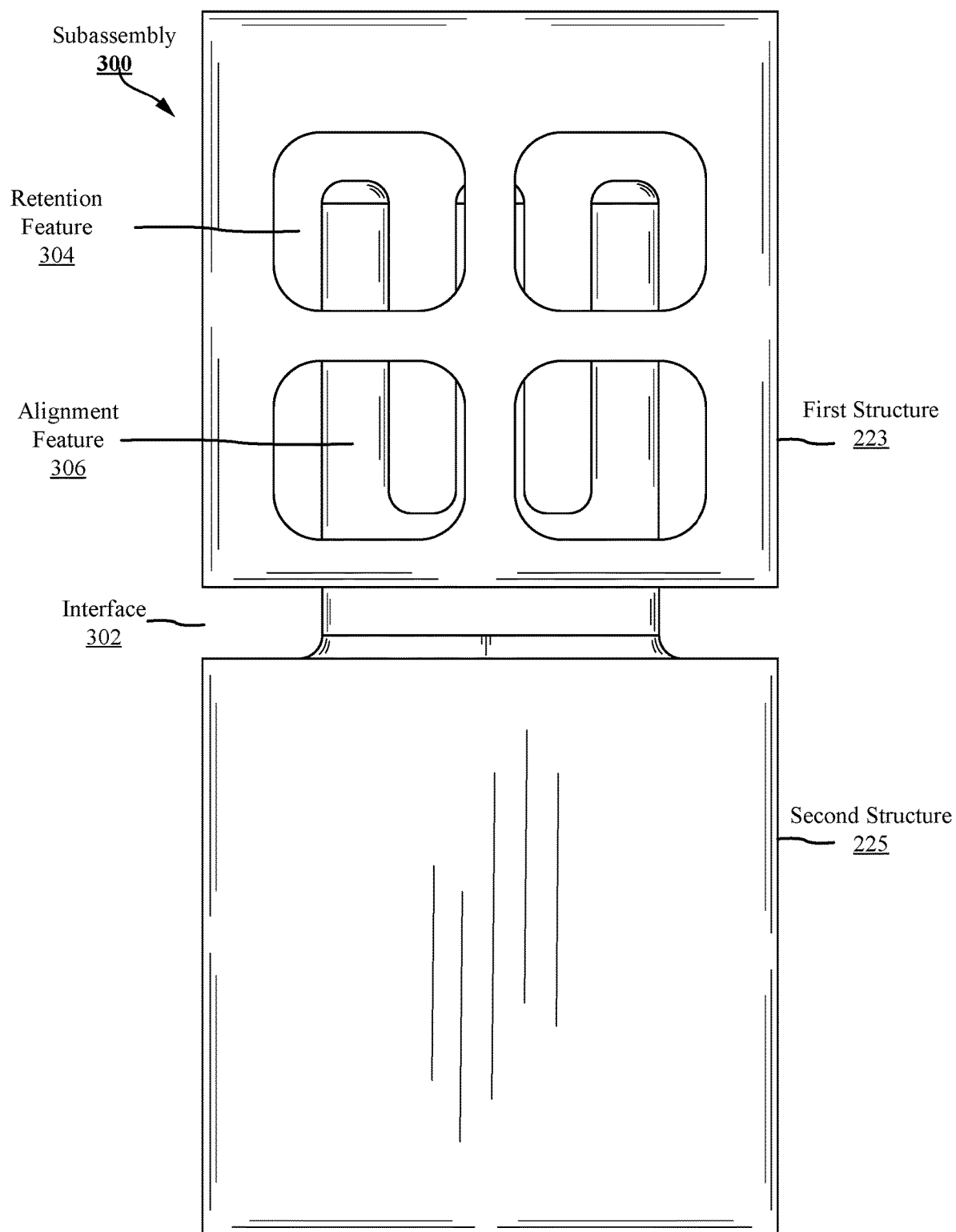
FIG. 3 illustrates a connection at a retention feature between structures in accordance with an aspect of the present disclosure.

FIG. 3 illustrates a connection at a retention feature between structures in accordance with an aspect of the present disclosure.

As shown in FIG. 3, a subassembly 300 may include multiple structures, e.g., first structure 223 and second structure 225. Where first structure 223 and second structure 225 join, e.g., at interface 302, first structure 223 may have a retention feature 304 while second structure 225 may have an alignment feature 306 that is coupled to retention feature 304.

The retention feature 304 may serve multiple functions, e.g., a visual assurance that first structure 223 and second structure 225 are coupled together, alignment of the first structure 223 and second structure 225, etc. Further, retention feature 304 may serve as an insertion point for an adhesive to bond first structure 223 and second structure 225 together.

When first structure 223 and second structure 225 are coupled together, an adhesive, such as a quick-cure adhesive, may be placed in alignment feature 223, while a second adhesive, such as a structural adhesive, may be placed elsewhere between first structure 223 and second structure 225. The quick-cure adhesive may provide a quick connection for the subassembly 300 during other assembly operations, such that subassembly can be handled and moved as a single piece for other assembly operations.

Moreover, FIG. 3 illustrates an example of a subassembly 300 including a first structure 223 joined to a second structure 225 using the retention feature 304 and alignment feature 306.

First structure 223 of subassembly 300 may have an adhesive dispensing robot (e.g., robot 113, 115, or 117) inject a quick-cure adhesive into retention feature 304. After the adhesive is dispensed into retention feature 304, the first structure 223 may also be exposed to EM radiation, e.g., ultraviolet (UV) light, to cure the quick-cure adhesive contained within the retention feature 304. Second structure 125, 300, 406 of subassembly 400 may include an alignment feature 306, which may be referred to as a tongue, which a material handling robot (e.g. robot 109 or 111) may place into the quick-cure adhesive within the retention feature 304 of the first structure 223. The tongue may include a plurality of segments spaced apart from each other (e.g. comb shape shown in FIG. 3), a plurality of openings (e.g. a waffle or grid shape) or may be a solid tongue which contacts the quick-cure adhesive when the alignment feature 306 (tongue) is inserted into the retention feature 304.

Figure 4:
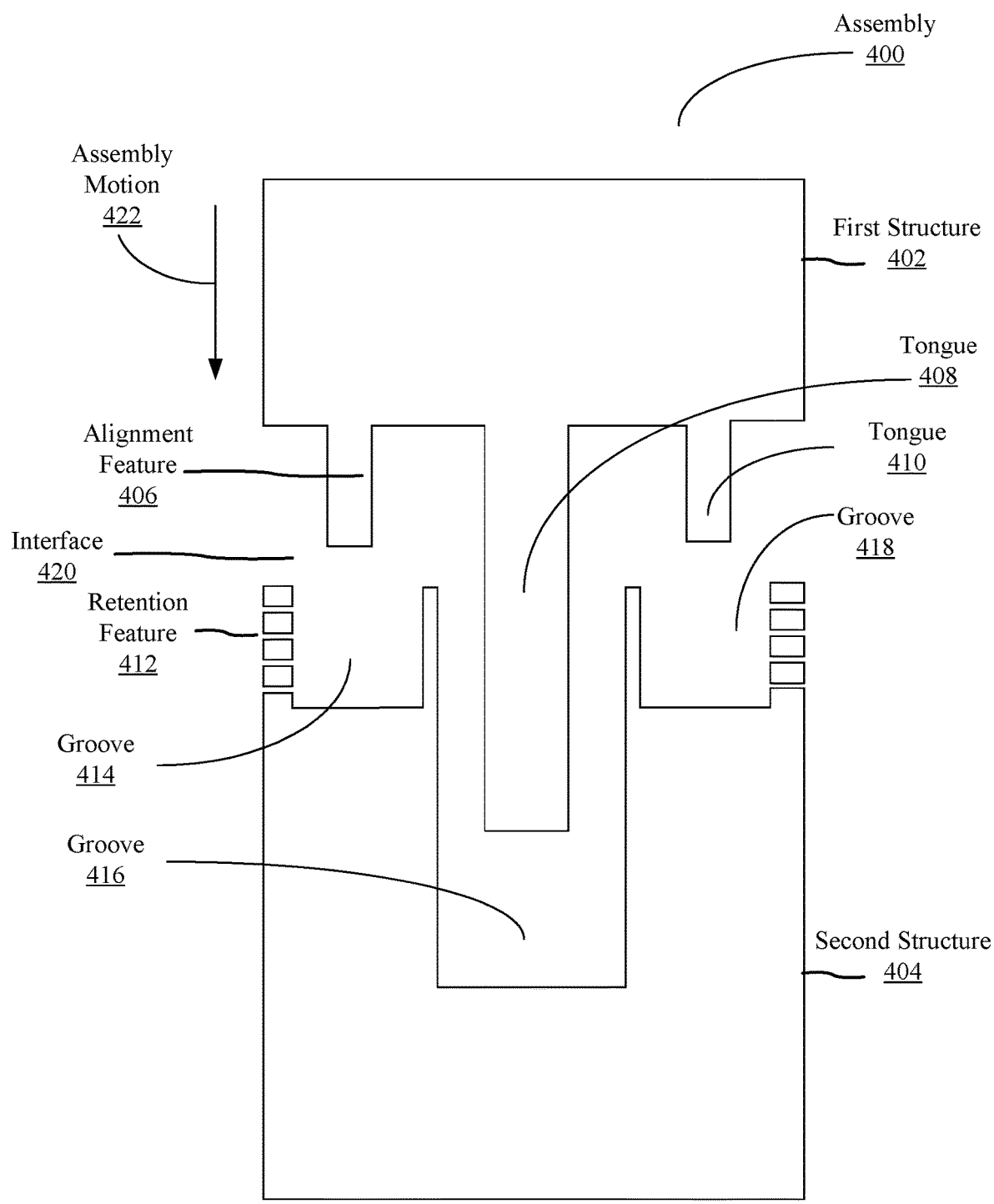
FIG. 4 illustrates a cross-sectional view of a tongue and groove connection in accordance with an aspect of the present disclosure.

FIG. 4 illustrates a cross-sectional view of a tongue and groove connection in accordance with an aspect of the present disclosure.

Assembly 400 may include, inter alia, first structure 402 and second structure 404. First structure 402 may include an alignment feature 406, (also referred to as tongue 406), tongue 408, and tongue 410. Second structure may include retention feature 412, groove 414, groove 416, and groove 418. First structure 402 and second structure 404 couple together to create assembly 400 at interface 420, when first structure and second structure are placed in proximity, with the assembly motion 422 being generally in the direction of the arrow shown in FIG. 4.

First structure 402 and second structure 404 may be additively manufactured as described herein, or may be made using other techniques or may be COTS parts without departing from the scope of the present disclosure.

In an aspect of the present disclosure, first structure 402 and second structure 404 are adhesively bonded together. Second structure 412 may have quick-curing adhesive, such as an ultraviolet (UV) light reactive adhesive, placed in grooves 414 and 418, which are on the exterior portions of second structure 412. In an aspect of the present disclosure, this quick-curing adhesive will hold first structure and second structure together but may not provide the only mechanical connection between first structure 402 and second structure 404. A second adhesive may be used in groove 416 to provide a stronger, more structurally comprehensive connection between first structure 402 and second structure 404. In some cases, however, a structural adhesive may take longer to cure and may require additional catalysts, e.g., heat, vacuum, etc., to be applied to assembly 400 to cure the structural adhesive, which in related art assembly techniques increases the assembly time. By using a quick cure adhesive at desired locations along interface 420, and a structural adhesive for more complete connections between first structure 402 and second structure 404, assembly time can be reduced while still providing a structurally sound coupling within assembly 400 and between assemblies in a given apparatus.

Figure 5:
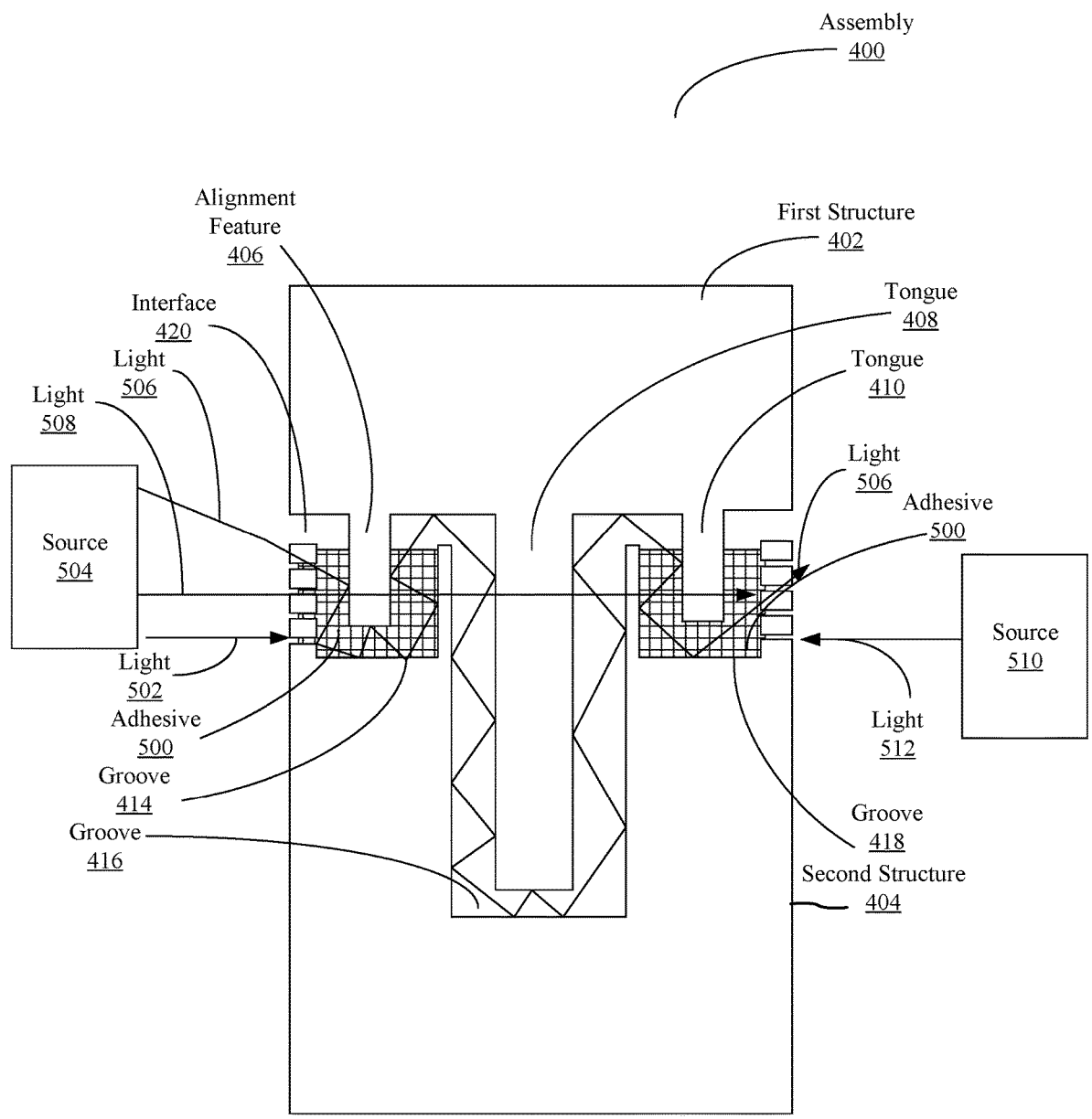
FIG. 5 illustrates a cross-sectional view of a tongue and groove connection in accordance with an aspect of the present disclosure.

FIG. 5 illustrates a cross-sectional view of a tongue and groove connection in accordance with an aspect of the present disclosure.

FIG. 5 illustrates the assembly 400 as an assembled unit, with first structure 402 coupled to second structure 404 using adhesive 500. Adhesive 500 is placed in groove 414 and 418 to couple first structure 402 to second structure 404.

In an aspect of the present disclosure, light 502 may be used to cure adhesive 500. Light 502 may be directed from one side of assembly 400, e.g., from source 504 to cure adhesive 500 in groove 414. However, in an aspect of the present disclosure, source 504 may produce light 502, light 506, and/or light 508.

In an aspect of the present disclosure, a second light source 510 may produce light 512, or light source 504 may be moved to produce light 512, such that adhesive 500 in groove 418 can be cured. In another aspect of the present disclosure, light 506 and/or light 508 may be used to cure adhesive 500 in groove 418, either during or after curing adhesive 500 in groove 414.

As shown in FIG. 5, in an aspect of the present disclosure light 506 may be reflected from one or more surfaces of grooves 414, 416, and/or 418, and may also be reflected from one or more surfaces of alignment feature 406, tongue 408, tongue 410, and/or alignment feature 406. In such an aspect, the adhesive 500 in groove 414 and groove 418 can be cured by source 504 from substantially the same location with light 506. Such a feature may be advantageous when groove 418 may not be readily accessible to source 504, e.g., when groove 418 is in a small space or internal to a given assembly 400.

In an aspect of the present disclosure, source 504 may produce light 508, which may shine through openings in alignment feature 406, tongue 408, and/or tongue 410. As shown in FIG. 4, alignment feature 406 may have linear tines or may be a gridded pattern, etc., that extend into groove 414. The openings between the tines and/or gridded pattern of alignment feature 406 may allow light 508 to pass through groove 414 and groove 416 to cure adhesive 500 that is located in groove 418, either in parallel with curing of the adhesive 500 in groove 414 or in series with curing the adhesive 500 in groove 414.

Once adhesive 500 in groove 414 and adhesive 500 in groove 418 are cured to the point of having enough structural integrity to hold first structure 402 and second structure 404 together, assembly 400 may be moved as a single unit rather than maintaining mechanical connections to both first structure 402 and second structure 404. In such an aspect of the present disclosure, assembly 400 may be coupled to other structures or assemblies, which may expedite the assembly process.

Figure 6:
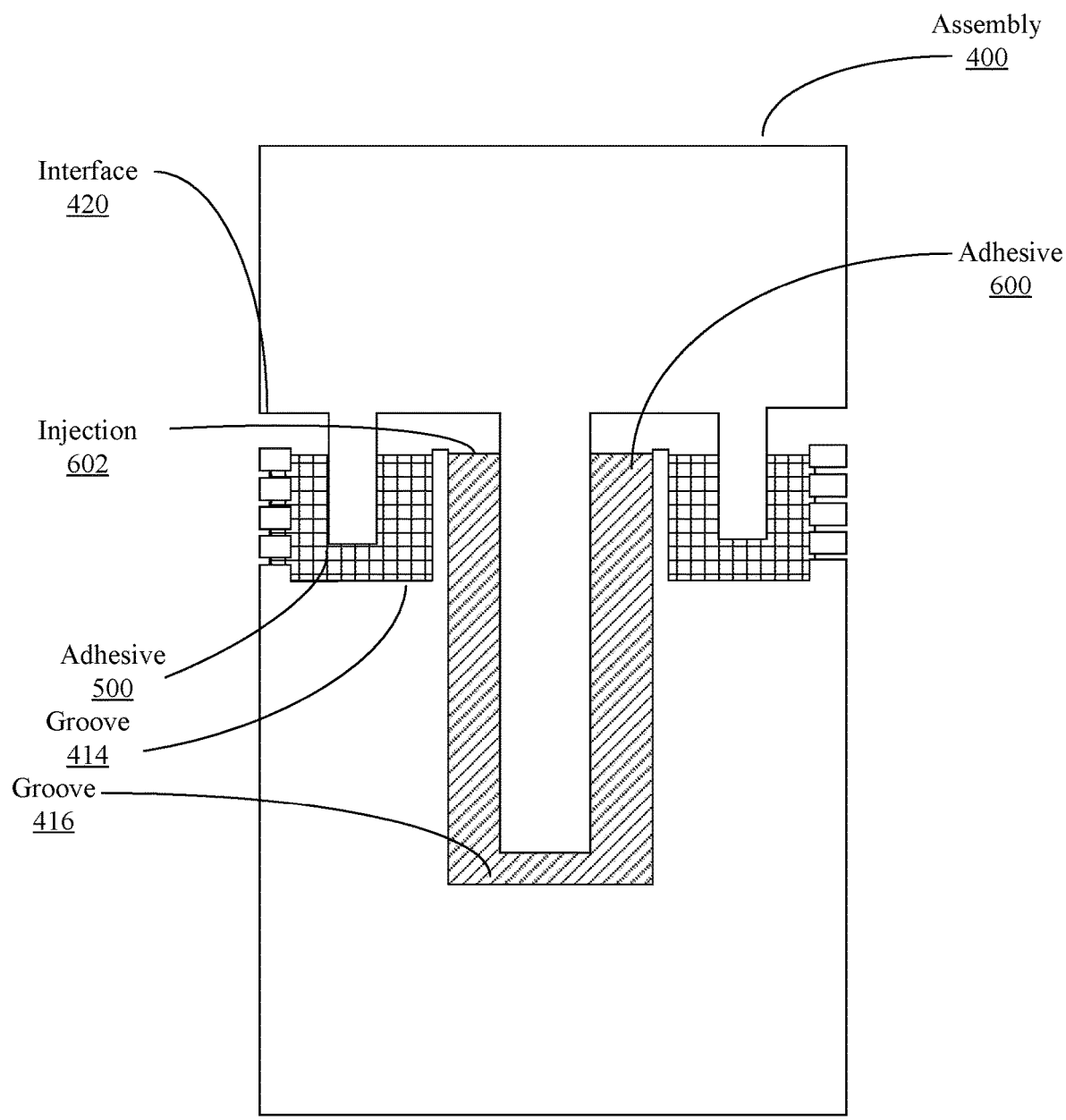
FIG. 6 illustrates a cross-sectional view of a tongue and groove connection in accordance with an aspect of the present disclosure.

FIG. 6 illustrates a cross-sectional view of a tongue and groove connection in accordance with an aspect of the present disclosure.

In an aspect of the present disclosure, adhesive 600 may be introduced into groove 416 to couple tongue 408 of first structure 402 to groove 416 of second structure 404.

As shown in FIG. 6, adhesive 600 may be introduced into groove 416 through injection 602, which may be at interface 420 of assembly 400. Further, injection 602 of adhesive 600 may be "direct" as in directly injected into interface 420, either at the interface 420 or near the injection location of adhesive 500, e.g., at or near retention feature 412. As adhesive 500 has already been cured as described with respect to FIG. 5, adhesive 500 may aid in directing injection 602 of adhesive 600 into groove 416. In an aspect of the present disclosure, injection 602 may be through at least one of groove 414 and 418 to inject adhesive 600 into groove 416 to contact tongue 408. Adhesive 600 may be a structural adhesive in an aspect of the present disclosure.

Figure 7:
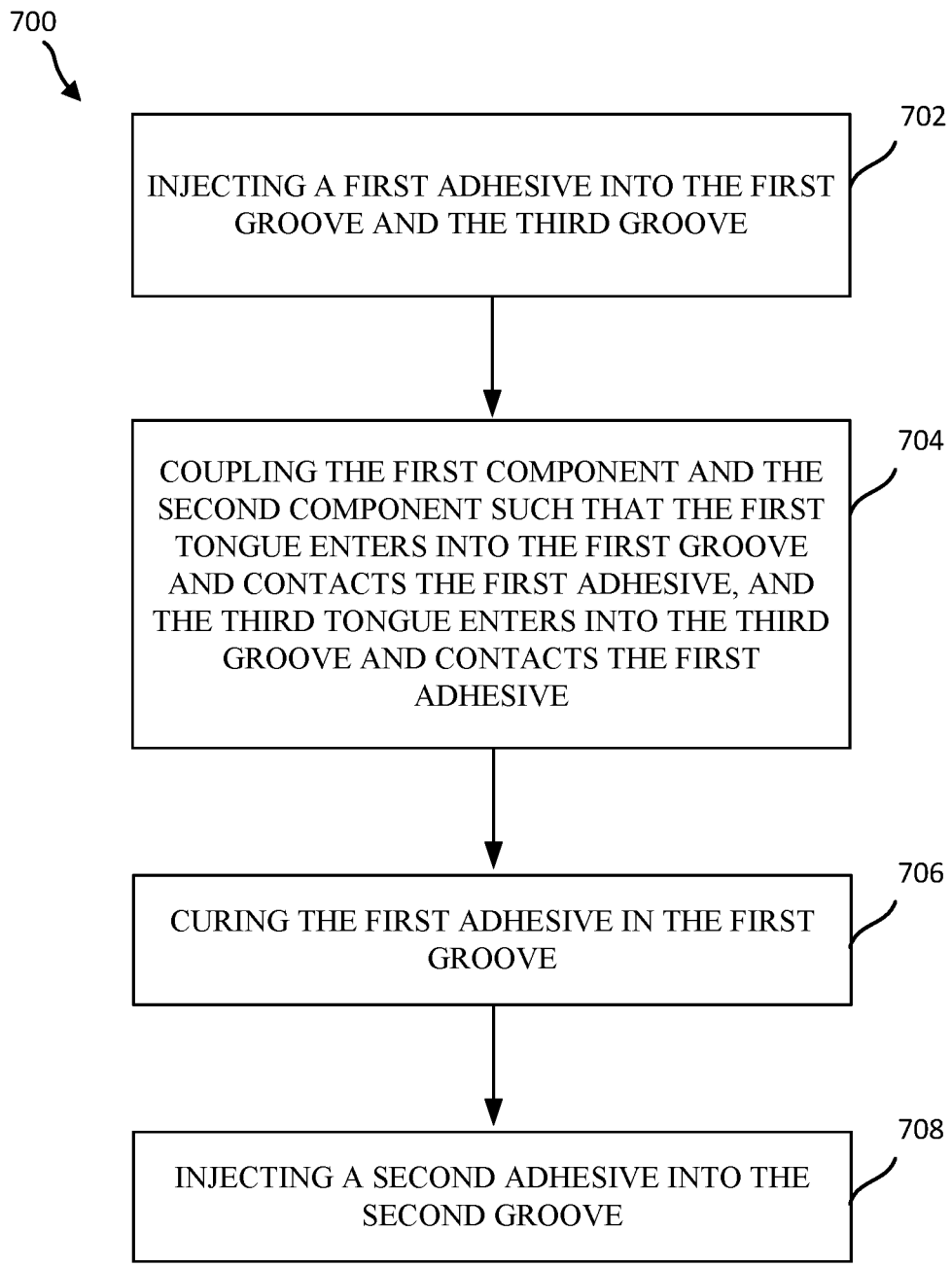
FIG. 7 illustrates a process for assembling additively-manufactured components in accordance with an aspect of the present disclosure.

FIG. 7 illustrates a process for assembling additively-manufactured components in accordance with an aspect of the present disclosure.

Process 700 includes block 702, which illustrates injecting a first adhesive into the first groove and the third groove. Block 702 is illustrated at least by the injection of adhesive 500 with respect to FIG. 5.

Block 704 illustrates coupling the first component and the second component such that the first tongue enters into the first groove and contacts the first adhesive, and the third tongue enters into the third groove and contacts the first adhesive. Block 704 is illustrated at least by motion 422 with respect to FIG. 4.

Block 706 illustrates curing the first adhesive in the first groove and the third groove. Block 706 is illustrated at least by light 506 with respect to FIG. 5.

Block 708 illustrates injecting a second adhesive into the second groove. Block 706 is illustrated at least by injection 602 with respect to FIG. 6.

Advantages of the Present Disclosure

In an aspect of the disclosure, the disclosure provides a method for assembling adhesively-bonded node structures with direct injection of a structural adhesive In an aspect of the present disclosure, the disclosure provides a method for assembling structures which may be more efficient than related art approaches.

One skilled in the art will appreciate that the joint structure described with respect to FIGS. 3-6 are simply illustrative examples of a structure that joins a first component with a second component and that variations to the components and techniques described may be used without departing from the scope of the present disclosure.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing nodes and interconnects. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method for coupling a first component having a first groove, a second groove, and a third groove, and a second component having a first tongue, a second tongue, and a third tongue, comprising:
    injecting a first adhesive into the first groove and the third groove;
    coupling the first component and the second component such that the first tongue enters into the first groove and contacts the first adhesive, and the third tongue enters into the third groove and contacts the first adhesive;
    curing the first adhesive in the first groove and the third groove;
    injecting a second adhesive into the second groove through at least the first groove or the third groove.

2. The method of claim 1, wherein curing the first adhesive comprises exposing the first adhesive to ultraviolet (UV) light.

3. The method of claim 2, further comprising passing the UV light through the first groove and through the second groove to expose the first adhesive in the third groove to the UV light.

4. The method of claim 3, further comprising reflecting the UV light from at least a surface of the first groove or the second groove.

5. The method of claim 4, further comprising reflecting the UV light from at least a surface of the first tongue or the second tongue.

6. The method of claim 1, further comprising structurally coupling the first component and the second component with the second adhesive.

* * * * *